(12) United States Patent
Crompvoets et al.

(10) Patent No.: US 12,554,144 B2
(45) Date of Patent: Feb. 17, 2026

(54) OPTICS FOR SLIM STYLE HEAD LIGHTING

(71) Applicant: LUMILEDS LLC, San Jose, CA (US)

(72) Inventors: Floris Maria Hermansz Crompvoets, Bunde (NL); Andreas Timinger, Aachen (DE)

(73) Assignee: Lumileds Singapore Pte. Ltd., Singapore (SG)

( * ) Notice: Subject to any disclaimer, the term of this patent is extended or adjusted under 35 U.S.C. 154(b) by 307 days.

(21) Appl. No.: 18/517,792

(22) Filed: Nov. 22, 2023

(65) Prior Publication Data

US 2024/0201510 A1 Jun. 20, 2024

Related U.S. Application Data

(60) Provisional application No. 63/432,858, filed on Dec. 15, 2022.

(51) Int. Cl.

| | |
|---|---|
| *G02B 27/30* | (2006.01) |
| *F21S 41/143* | (2018.01) |
| *F21S 41/25* | (2018.01) |
| *G02B 3/00* | (2006.01) |
| *G02B 27/09* | (2006.01) |
| *F21Y 115/10* | (2016.01) |

(52) U.S. Cl.
CPC ............ *G02B 27/30* (2013.01); *F21S 41/143* (2018.01); *F21S 41/25* (2018.01); *G02B 3/0056* (2013.01); *G02B 27/0905* (2013.01); *G02B 27/0916* (2013.01); *G02B 27/0938* (2013.01); *F21Y 2115/10* (2016.08); *G02B 2003/0093* (2013.01)

(58) Field of Classification Search
CPC .......................... G02B 27/30; G02B 27/0905; G02B 27/0916; G02B 27/0938; G02B 27/0961; G02B 3/0056; G02B 2003/0093; F21S 41/143; F21S 41/25; F21Y 2115/10
USPC ........................................................ 359/641
See application file for complete search history.

(56) References Cited

U.S. PATENT DOCUMENTS

| | | | | |
|---|---|---|---|---|
| 7,411,735 | B2 * | 8/2008 | Magarill ............ | G02B 27/0961 359/641 |
| 8,599,485 | B1 * | 12/2013 | Cobb ................. | G02B 27/0977 359/641 |
| 8,688,401 | B2 * | 4/2014 | Papac ................. | A61B 3/0008 351/221 |
| 12,153,225 | B2 * | 11/2024 | Crompvoets ......... | F21S 41/143 |
| 2004/0213514 | A1 | 10/2004 | Tanaka et al. | |
| 2006/0103835 | A1 | 5/2006 | Artsyukhovich et al. | |
| 2007/0127245 | A1 * | 6/2007 | Magarill ............ | G03B 21/2033 362/291 |

(Continued)

Primary Examiner — William R Alexander
(74) Attorney, Agent, or Firm — Volpe Koenig

(57) ABSTRACT

An optical system is provided. The optical system includes a light emitting diode that generates light emissions. The optical system includes a collimator that receives the light emissions and that generates a collimated beam. The optical system includes an etendue re-shaper that splits the collimated beam into beam parts and that arranges the beam parts adjacent to each other to generate an adjacent beam part arrangement. The optical system includes micro-lens arrays that receive the adjacent beam part arrangement and that generate beams. Each of the beams includes an optimum optical efficiency or a far field intensity distribution.

15 Claims, 9 Drawing Sheets

(56) References Cited

U.S. PATENT DOCUMENTS

| | | | |
|---|---|---|---|
| 2008/0230723 A1* | 9/2008 | Tanaka | H01S 3/005 |
| | | | 372/9 |
| 2013/0163276 A1* | 6/2013 | Papac | A61B 3/0008 |
| | | | 362/574 |
| 2014/0211466 A1* | 7/2014 | Dewa | G02B 6/425 |
| | | | 362/235 |
| 2016/0225477 A1* | 8/2016 | Banine | G03F 7/70891 |
| 2024/0142861 A1* | 5/2024 | Pertierra | G03B 21/008 |
| 2024/0200742 A1* | 6/2024 | Crompvoets | F21S 41/143 |

* cited by examiner

OPTICS FOR SLIM STYLE HEAD LIGHTING

CROSS-REFERENCE TO RELATED APPLICATIONS

This application claims priority to provisional U.S. Application No. 63/432,858, filed Dec. 15, 2022, the contents of which are hereby incorporated by reference in their entirety.

BACKGROUND

Conventional technologies for automotive front lighting trend towards smaller, slimmer, and more compact solutions, such as a slim optic design utilizing a micro-lens array (MLA). Yet, despite the potential of MLAs, MLAs introduce problems in the slim optic design that actually reverse the trend. For instance, a slim optic design cannot be constructed with MLAs because MLAs require a collimated input and because an acceptance angle for the collimated input must be less than a threshold, such as ten (10) degrees. To provide the required collimated input and acceptance angle, large optics are needed within the slim optic design. Large optics would be a course reversal from smaller, slimmer, and more compact designs. Further, while pre-collimator optics for MLAs can be tailored to a specific design case, pre-collimator optics are not amenable for re-use and scaling.

If MLAs are to be used in automotive front lighting, a solution is needed to achieve the slim optic design.

SUMMARY

According to one or more embodiments, an optical system is provided. The optical system includes a light emitting diode that generates light emissions. The optical system includes a collimator that receives the light emissions and that generates a collimated beam. The optical system includes an etendue re-shaper that splits the collimated beam into at least two beam parts and that arranges the at least two beam parts adjacent to each other to generate an adjacent beam part arrangement. The optical system includes one or more micro-lens arrays that receive the adjacent beam part arrangement and that generate two or more beams. Each of the two or more beams includes an optimum optical efficiency or a far field intensity distribution.

According to one or more embodiments, an optical system is provided. The optical system includes a collimator that receives light emissions and that generates a collimated beam. The optical system includes an etendue re-shaper that splits the collimated beam into at least two beam parts and that arranges the at least two beam parts adjacent to each other to generate an adjacent beam part arrangement. The optical system includes an optical relay system that maps a light distribution of a beam part of the at least two beam parts to a same plane as an exit plane of the etendue re-shaper.

According to one or more embodiments, an optical system is provided. The optical system includes a collimator that receives light emissions and that generates a collimated beam. The optical system includes an etendue re-shaper that splits the collimated beam into at least two beam parts and that arranges the at least two beam parts adjacent to each other to generate an adjacent beam part arrangement. The optical system includes an optical relay system that maps a light distribution of a beam part of the at least two beam parts to a same plane as an exit plane of the etendue re-shaper. The optical relay system includes an absorber that adjusts a flux in the beam part of the collimated beam to match an illuminance of the beam part with an illuminance of a second beam part of the collimated beam at an exit plane of the etendue re-shaper.

BRIEF DESCRIPTION OF THE DRAWINGS

A more detailed understanding can be had from the following description, given by way of example in conjunction with the accompanying drawings wherein.

DETAILED DESCRIPTION

According to one or more embodiments, described herein is an optical system. The optical system can utilize a light emitting diode ("LED") to generate light emissions that are passed through a collimator to generate a collimated beam. The optical system can further utilize an etendue re-shaper to split the collimated beam in two beam parts, arranges the two beam parts adjacent to each other, and generates the adjacent beam part arrangement as inputs to one or more MLAs. The one or more MLAs can, in turn, generate two or more beams with an optimum optical efficiency and a (designed) far field intensity distribution. The technical effects, advantages, and benefits of the optical system include making the light emissions nearly parallel at or below required acceptance angles for the one or more MLAs, while reducing or eliminating optical cross-talks between adjacent optical channels of the MLAs.

Examples of different light illumination systems and/or LED implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

Figure 1:
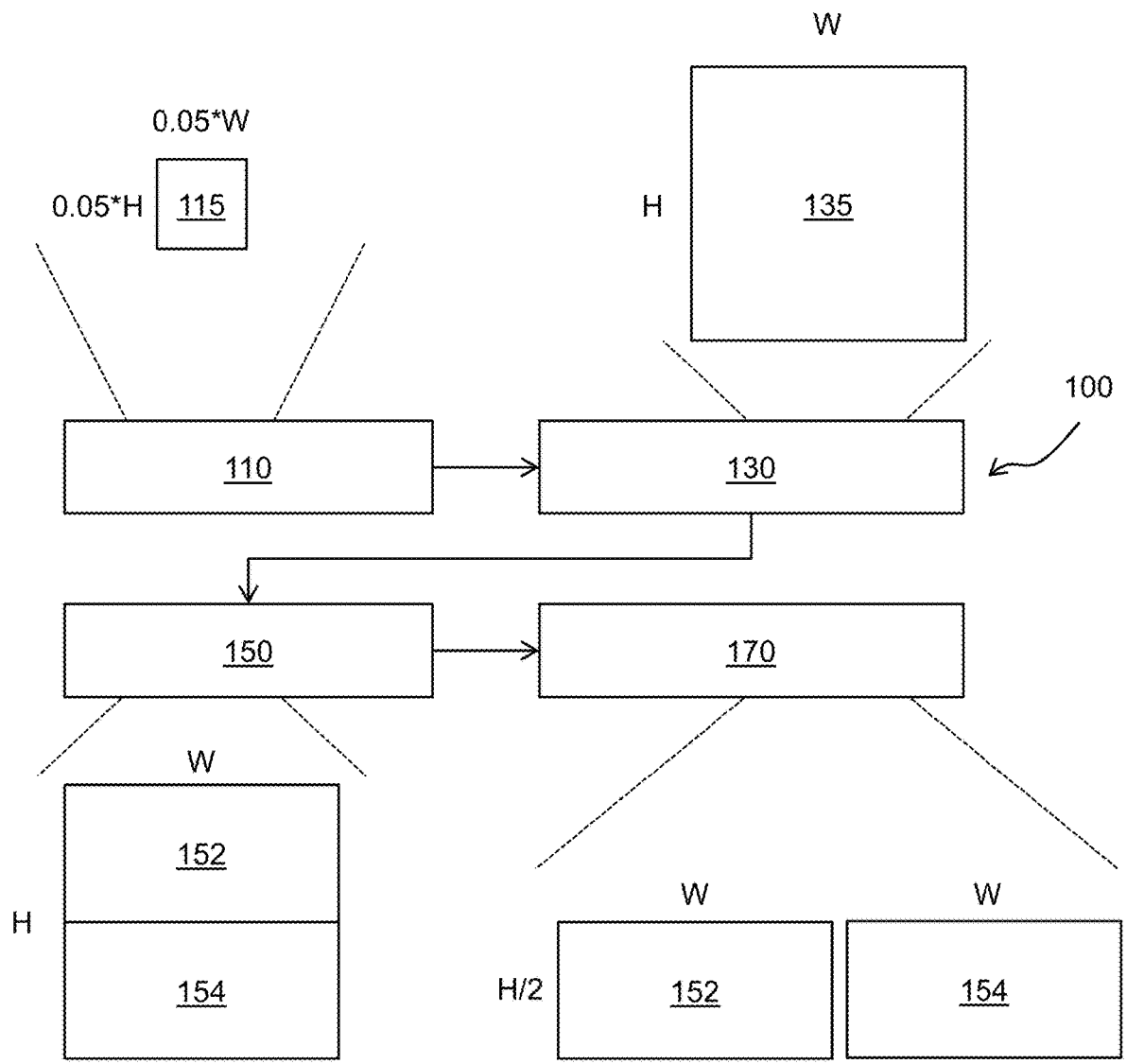
FIG. 1 shows a method describing operations of an optical system according to one or more embodiments.

FIG. 1 shows a method 100 describing operations of an optical system according to one or more embodiments. The operations of the optical system show a principle of etendue re-shaping for MLAs. The method 100 is accompanied by example elements to further illustrate the operations of the optical system. The method 100 begins at block 110, a light source of the optical system can generate a beam including an etendue. The light source can be an LED as described herein. An etendue is a property of light in the optical system. The etendue uses area and angle to characterize how "spread out" light is. In the method 100, the LED of the optical system can generate the beam including an LED LEA etendue 115. In this example, only a spatial part of the LED LEA etendue 115 is shown, and the LED LEA etendue 115 starts with a fractional height H by a fractional width W, i.e., 0.05*H by 0.05*W size (not to scale).

At block 130, a collimator of the optical system can generate a collimated beam including a collimated beam etendue shape. The collimator can be a collimated optic or lens. By way of example, the beam from the LED is collimated by the collimator, thereby increasing a spatial part of the LED LEA etendue 115 to a collimated beam etendue shape 135. As shown in FIG. 1, the LED LEA etendue 115 of the beam is increased by a factor of twenty (20) in both transversal directions (i.e., H×W). In turn, a resulting collimated beam from the collimator includes the collimated beam etendue shape 135 that is equal to a height H by a width W, i.e., Etendue=H×W.

At block 150, the collimated beam including the collimated beam etendue shape can enter an etendue re-shaper. Note that the collimated beam etendue shape generated by the collimator at block 130 is a same etendue shape at the entrance of the etendue re-shaper. According to one or more embodiments, the etendue re-shaper can divide the collimated beam into equal parts of any number, such as two or three equal beam parts. Upon entry, the collimated beam etendue shape is split into at least two parts, e.g., an Etendue Part A 152 and Etendue Part B 154. For example, the at least two parts maintain an etendue that is equal to a height H by a width W, i.e., Etendue=H×W. According to one or more embodiments, the entrance of the etendue re-shaper of the optical system can be positioned close to the collimator of the optical system so that a residual divergence of the collimated beam increases a spatial size of the collimated beam etendue shape 135 (i.e., the optical system utilizes free space without any interactions with optical elements to enable the residual divergence). According to one or more embodiments, the spatial size of the collimated beam etendue shape 135 is maintained by utilizing a relay optics, as also described herein.

According to one or more embodiments, the etendue re-shaper can include a phase space volume re-shaper. The phase space of the phase space volume re-shaper can include a spatial component and a conjugate angular component. The phase space volume re-shaper can slice the collimated beam from the collimator spatially in at least two equal parts. Each part of the collimated beam can be transported to a new position (e.g., arranges the beam parts adjacent to each other and generates an adjacent beam part arrangement). At the new position, the beam parts (a.k.a., the adjacent beam part arrangement) exits the phase space volume re-shaper and enter the MLAs. Note that each beam part has a corresponding MLA, as well as can follow a corresponding optical channel to that MLA. According to one or more embodiments, the etendue re-shaper can shape adjacent beam parts, such as slim in height or width, and can provide the beam parts vertically or horizontally in the adjacent beam part arrangement. The technical effects, advantages, and benefits of the optical system include slicing the beam (e.g., or phase space) into resulting parts that are narrower (i.e., lower in height or thinned in width) to provide conservation of phase space volume or surface. The technical effects, advantages, and benefits of the optical system further includes expanding or widening a resulting beam or the adjacent beam part arrangement at the exit of the phase space volume re-shaper (i.e., a spatial distribution is reshaped), while a phase space volume is conserved and an angular distribution is not changed. Thus, the optical system reshapes the beam of the light source in only a spatial part of the etendue due to a collimated nature of the beam.

According to one or more embodiments, the etendue re-shaper can include an optical grade material, like polymethyl methacrylate (PMMA) or polycarbonate. According to one or more embodiments, the etendue re-shaper can include a plurality of parts and/or a plurality of deflecting surfaces, e.g., to provide total internal reflection. Each of the plurality of parts can propagate and/or reshape beam parts of the collimated beam. Each deflecting surfaces (as configured in the plurality of the part of the etendue re-shaper) shifts the collimated beam left, right, up, or down. According to one or more embodiments, a deflecting surface can interact once with each beam part. Further, a deflecting surface can have multiple reflections providing a whole beam part is reflected. In turn, a number of deflecting surfaces dictates a design of the etendue re-shaper. A size and length of the etendue re-shaper is provided and manufactured according to a phase space volume of the collimated beam. A total length of the etendue re-shaper is provided and manufactured for the optical system to reduce or eliminate undesired kaleidoscopic effects. The etendue re-shaper includes one or more straight sections to avoid, reduce, or eliminate straylight and non-total internal reflection (non-TIR) conditions. The etendue re-shaper is also provided and manufactured so that the collimated beam has a single interaction with each deflecting surface therein (i.e., one reflection per surface within the etendue re-shaper).

At block 170, the at least two parts can exit the etendue re-shaper, as the resulting beam or the adjacent beam part arrangement. As noted herein, the etendue re-shaper "splits" the collimated beam etendue shape 135 in equal parts (e.g., in some cases two equal A and B parts) and "moves" or re-distributes the equal parts into an adjacent configuration. The resulting etendue and beam height is decreased/multiplied by a number of equal parts, while a beam width is increased/multiplied by the number of equal parts. Note that the beam remains collimated as required for the MLAs that are positioned further downstream in an optical path. For example, at the exit of the etendue re-shaper, an etendue is equal to half a height H by a width W plus another width W, i.e., Etendue=H/2×(W+W)=H×W.

According to one or more embodiments, the optical system can include a second etendue re-shaper and/or relay optics. The second etendue re-shaper and/or relay optics can copy the collimated beam at the exit of the collimator (e.g., the optical system can leverage benefits from an optical relay system in a non-shifted part of the beam). According to one or more embodiments, the optical system can include a part of the etendue re-shaper that can diverge more than another part of the etendue re-shaper. This divergence can be controlled with relay optics (e.g., a 1:1 telescope of two lenses). According to one or more embodiments, the etendue re-shaper can include two or three parts for splitting and arranging the collimated beam received from the collimator. According to one or more embodiments, the optical system provides a balanced integrated lighting system that can be manufactured as a slim optic design in discrete or aesthetically desired shapes for automotive head lighting, while not spilling 50% of the light.

Figure 2:
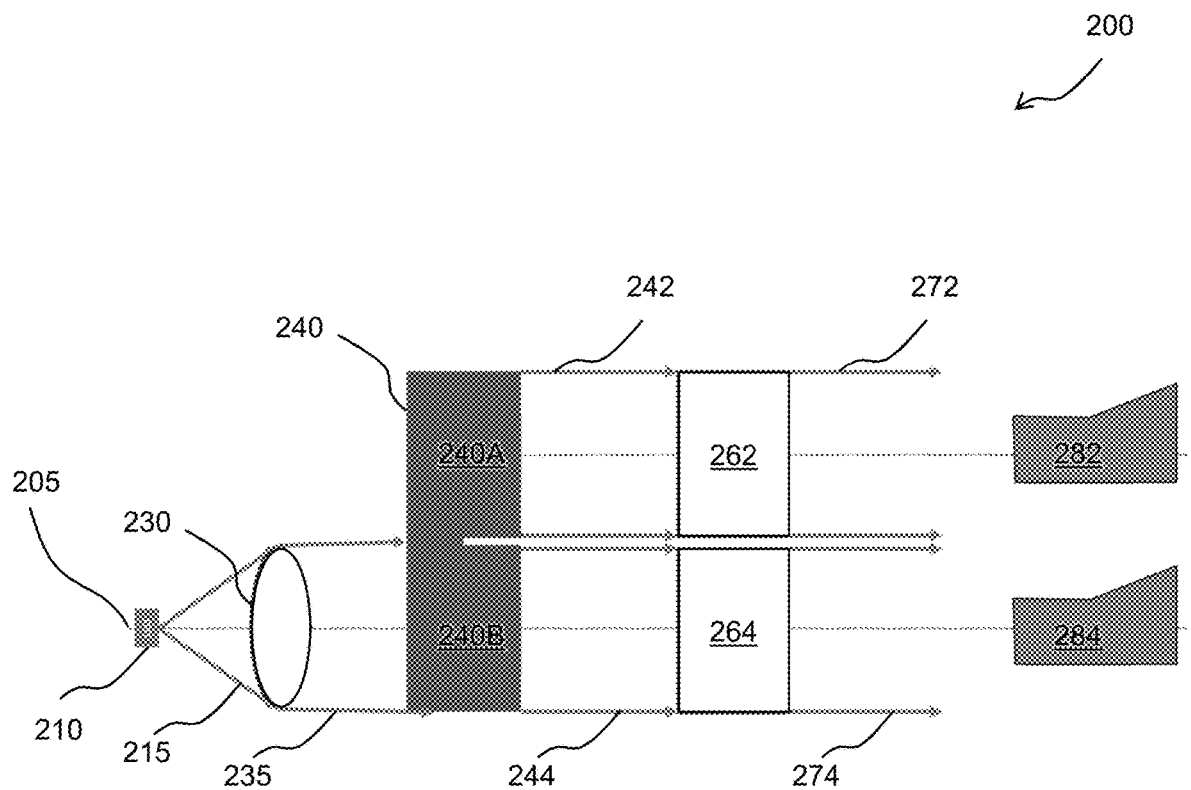
FIG. 2 shows a schematic of an optical system according to one or more embodiments.

FIG. 2 shows a schematic of an optical system 200 according to one or more embodiments. The operations of the optical system 200 are depicted relative to an optical axis 205. The optical system 200 can include a light emitting diode ("LED") 210 to generate light emissions 215. The LED 210 is representative of any light source. By way of example, the LED 210 can be a high luminance light source, with a small, high flux, Lambertian radiation profile. For example, the light emissions 215 can include the LED LEA etendue 115 of FIG. 1. The light emissions 215 are passed (as shown by the arrows, which optical paths and collimation) through a collimator 230 to generate a collimated beam 235. The collimator 230 represents any collimated optics or lenses. Examples of the collimator 230 include, but are not limited to, lenses, reflectors, compound parabolic concentrators (CPCs), and a combination of refractive and reflective optics. The collimator 230 make a Lambertian emission of the LED 210 nearly parallel or parallel (i.e., the collimator 230 generates parallel light with an opening angle below a predetermined threshold as described herein). For example, the collimated beam 235 can include the collimated beam etendue shape 135 of FIG. 1. Relative terms, such as "about", "near", "high", "maximum", etc., are used herein to describe a relationship of one element, part, or object to another element, part, or object, and it is understood that these terms are intended to encompass different orientations with range of possible orientations.

The optical system 200 further utilizes an etendue re-shaper 240 to split the collimated beam 235 in two or more beam parts (i.e., two beam parts 242 and 244) and arranges the two or more beam parts adjacent to each other, which generates an adjacent beam part arrangement. As shown in the optical system 200, the etendue re-shaper 240 can include a first part 240A and a second part 240B. The first part 240A reshapes an 'first beam part' of the collimated beam. The second part 240B propagates a 'second beam part' of the collimated beam in a free space, where the second beam part is then "combined" at an exit plane of the etendue re-shaper 240 with the first beam part. Note that first and second are used herein to describe separate beam parts and etendue parts and positions thereof can be designated as lower, upper, side, back, front etc.

Note that, because MLAs have small acceptance angles (i.e., approximately ten degrees (10°) or less), the etendue re-shaper 240 is required to utilize the collimated beam to match or be within/below an MLA acceptance angle. Without the collimated beams, optical cross-talk arises between adjacent optical channels of the MLAs (and cross-talk is difficult to control and undesired). For example, a result of the etendue re-shaper 240 is a collimated beam with a reduced height (H/2) and an increased width (W*2). The adjacent beam part arrangement is provided to one or more MLAs (i.e., two MLAs 262 and 264) and remains collimated as required for the one or more MLAs that are positioned further downstream in the optical axis 205. For example, the two beam parts 242 and 244 can include the Etendue Part A 152 and Etendue Part B 154 of FIG. 1, which are provided to the two MLAs 262 and 264.

The one or more MLAs, in turn, separately generate two or more beams with a maximum illuminance or intensity, an optimum optical efficiency, and/or a far field intensity distribution, which can be designed according to operations of the MLAs. Note that the optical system 200 can be designed to achieve an optimum or highest optical efficiency. Optical efficiency can relate to how much light (i.e., lumens) from a light source (i.e., the LED 210) is emitted by the optical system 200 after all cover lenses and other optical elements are accounted for. And, because optical efficiency can be characterized by a ratio of lumen_out/lumen_source, which can be a critical quality or customer parameter, the optical system 200 can be designed to optimize the optical efficiency or achieve a highest optical efficiency. Note that intensity can be used to characterize beams, while illuminance can be used describe how much light lx was projected on a road surface (e.g., lx=lm/m$^2$). As shown in FIG. 2, the two MLAs 262 and 264 each provide separate beam parts 172 and 172 that include far field intensity distributions 282 and 284. The far field intensity distributions 282 and 284 are example distributions or shapes that can be made by the two MLAs 262 and 264.

According to one or more embodiments, while the far field intensity distributions 282 and 284 are similarly shown, each far field intensity distribution 282 and 284 can be different (e.g., each MLA can be different to provide different efficiencies, intensities, and distributions). The technical effects, advantages, and benefits of the optical system 200 include making the light emissions nearly parallel to meet required acceptance angles for the two MLAs 262 and 264, while reducing or eliminating optical cross-talks between adjacent optical channels of the two MLAs 262 and 264.

According to one or more embodiments, the technical effects, advantages, and benefits of the optical system 200 can include gaps between parts of the optical system 200 to allow space for mechanical frames around the two MLAs 262 and 264. Additionally, because there can be differences between the separate beam parts 172 and 172 in maximum illuminance or intensity, the optical system 200 compensates for these differences by providing a symmetrical design of the etendue re-shaper 240 (i.e., rather than the second part 240B being a free space) that improve symmetry in an illuminance beam shape. According to one or more embodiments, the optical system 200 optimizes optical efficiency by utilizing TIR and dictating a design of the etendue re-shaper 240. For instance, angled parts of the etendue re-shaper 240 shift beam parts horizontally and vertically, and lengths and shifts depend on refractive indexes and associated angles of total internal reflection (TIR). Thus, a construction material changes the design of the etendue re-shaper 240 due to different angles of TIR. According to one or more embodiments, instead of using TIR, the etendue re-shaper 240 implements reflective surfaces (e.g., metal coatings). Additionally, the etendue re-shaper 240 described herein can be scaled to other dimensions so that practical mechanical attachment of the etendue re-shaper 240 to external elements are made with minimal optical contact at points where the light beam does not interact with walls of the etendue re-shaper 240.

Figure 3:
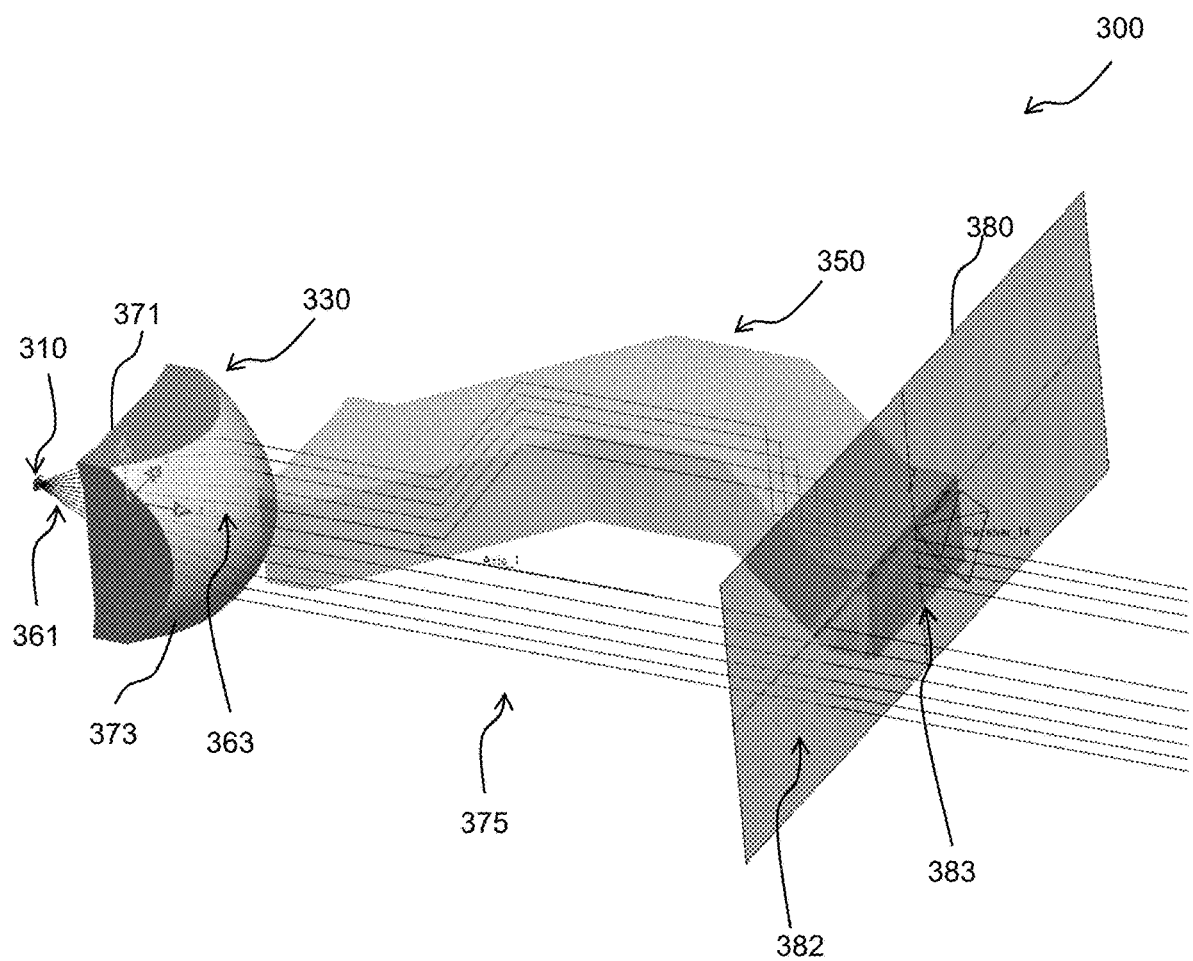
FIG. 3 shows a schematic of an optical system according to one or more embodiments.

FIG. 3 shows a schematic of an optical system 300 according to one or more embodiments. The operations of the optical system 300 can include an LED 310, a collimator 330, and an etendue re-shaper 350. MLAs of the optical system 300, while not shown for ease of illustration, receive the light ray parts exiting the etendue re-shaper 350. That is, the optical system 300 present optical elements together with a light distribution (i.e., illuminance) at an exit of the etendue re-shaper 350.

As shown in FIG. 3, light 361 is emitted from the LED 310 and collimated with the collimator 330 to generate a collimated beam 363. According to one or more embodiments, by way of example, the LED 310 emits light 361 with a light emitting area of 0.9×1.2 mm wide by 0.6×1.2 mm high (e.g., 1.06×1.06 mm$^2$) into the collimator 330. Further, the collimator 330 is optimized for collimation at an LED facing surface 371 and a re-shaper facing surface 373. A size of the collimator 330 and hence an original beam size at the exit of the collimator 330 and entrance of the etendue re-shaper 350 can by larger than 15×15 mm², such as 20×20 mm² in this example.

Figure 4A:
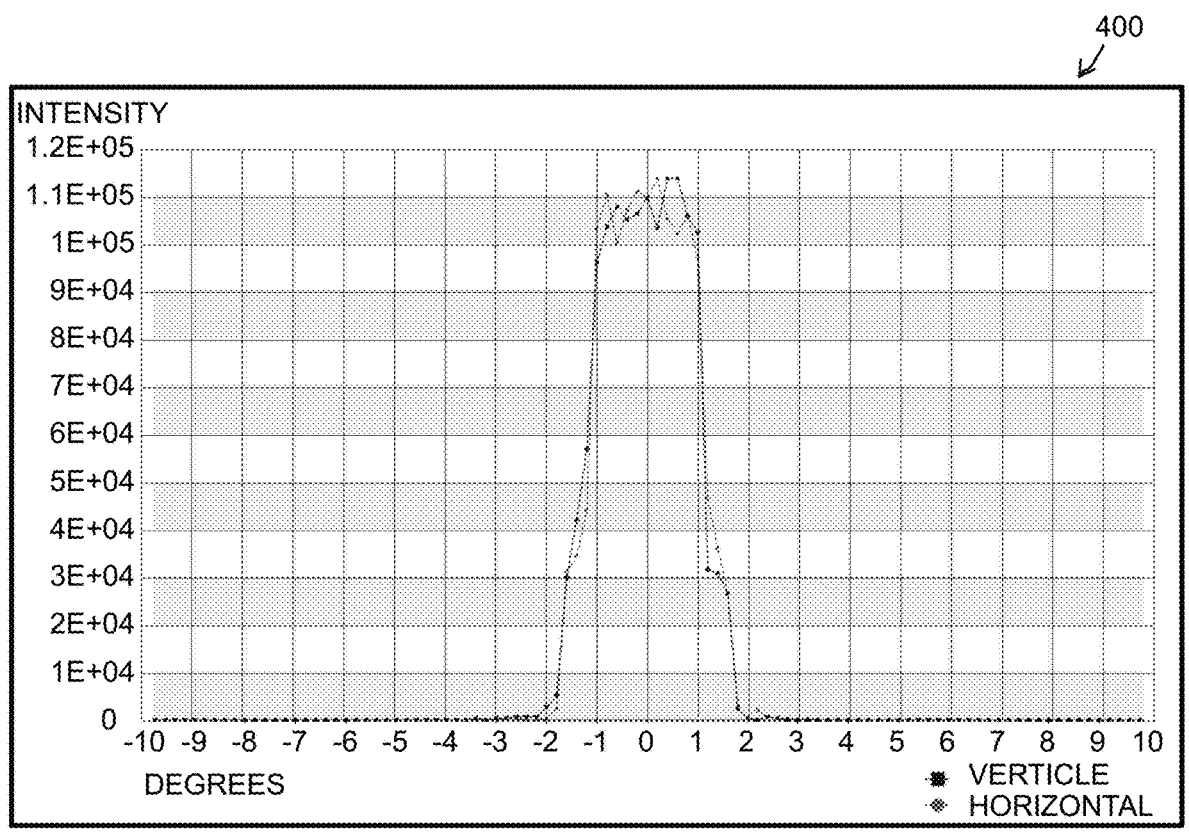
FIG. 4A shows a graph of a collimated beam profile used as input for an etendue re-shaper according to one or more embodiments.

Turning to FIG. 4A, a graph 400 shows a collimated beam profile used as an input for the etendue re-shaper 350 according to one or more embodiments. As shown by the graph 400, the collimated beam 363 has a full width at half maximum (FWHM) of approximately two degrees (2°), which is a beam width that is acceptable for MLAs of the optical system 300.

Part of light rays (e.g., a first beam part) of the collimated beam 363 enter the etendue re-shaper 350, while other parts (e.g., a second beam part) enter a free space adjacent 375 thereto (note the arrows illustrate optical paths through the optical system 300). By way of example, light distributions (illuminance) for the optical system 300 are shown at an exit plane 380 of the etendue re-shaper 350. On the exit plane 380, a light distribution 382 is shown for the second beam part, and a light distribution 383 at an exit of the etendue re-shaper 350. In some case, as noted with a sensitivity analysis, the etendue re-shaper 350 works less well when reducing a collimation of an incoming beam from FWHM 2.5° to 5°, as TIR conditions are not met, which leads to stray light and inhomogeneous illumination at the exit plane 380. The optical system 300 restores performance by increasing a length of deflecting parts of the etendue re-shaper 350 (i.e., effectively capturing a broader beam or, in other words, a larger phase space volume).

Figure 4B:
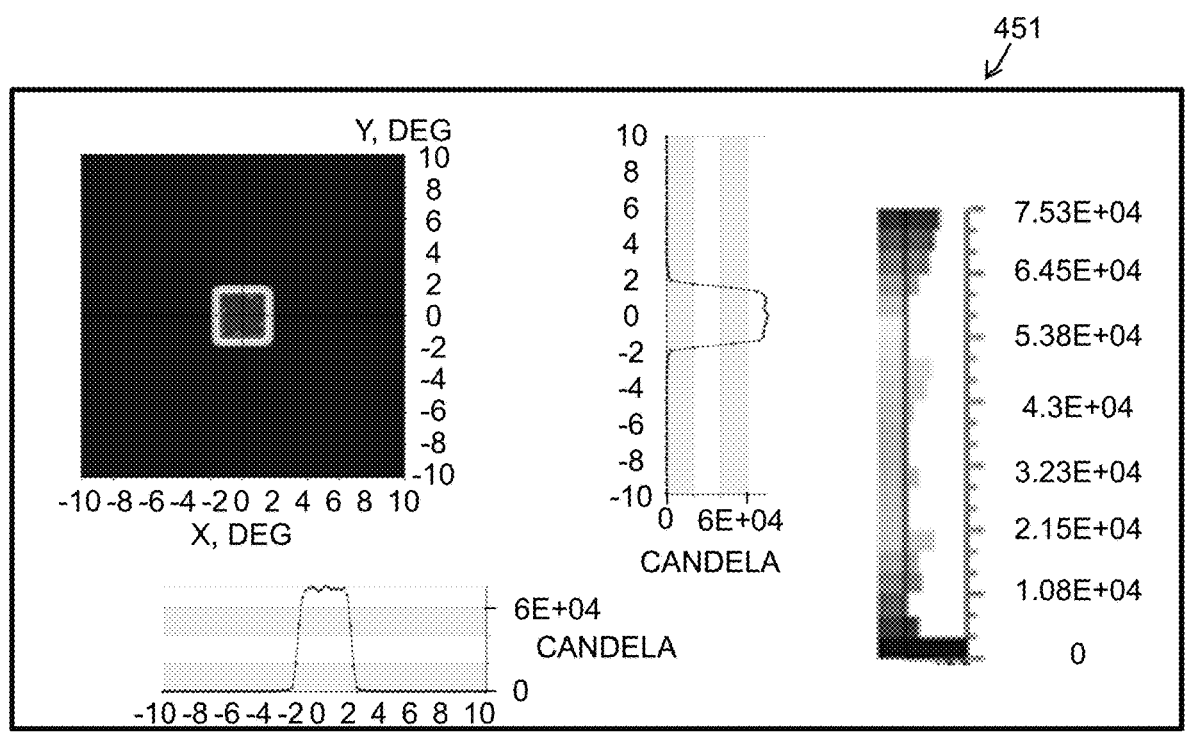
FIG. 4B shows graphs of far field intensity distributions without and with an etendue re-shaper according to one or more embodiments.
Figure 4B:
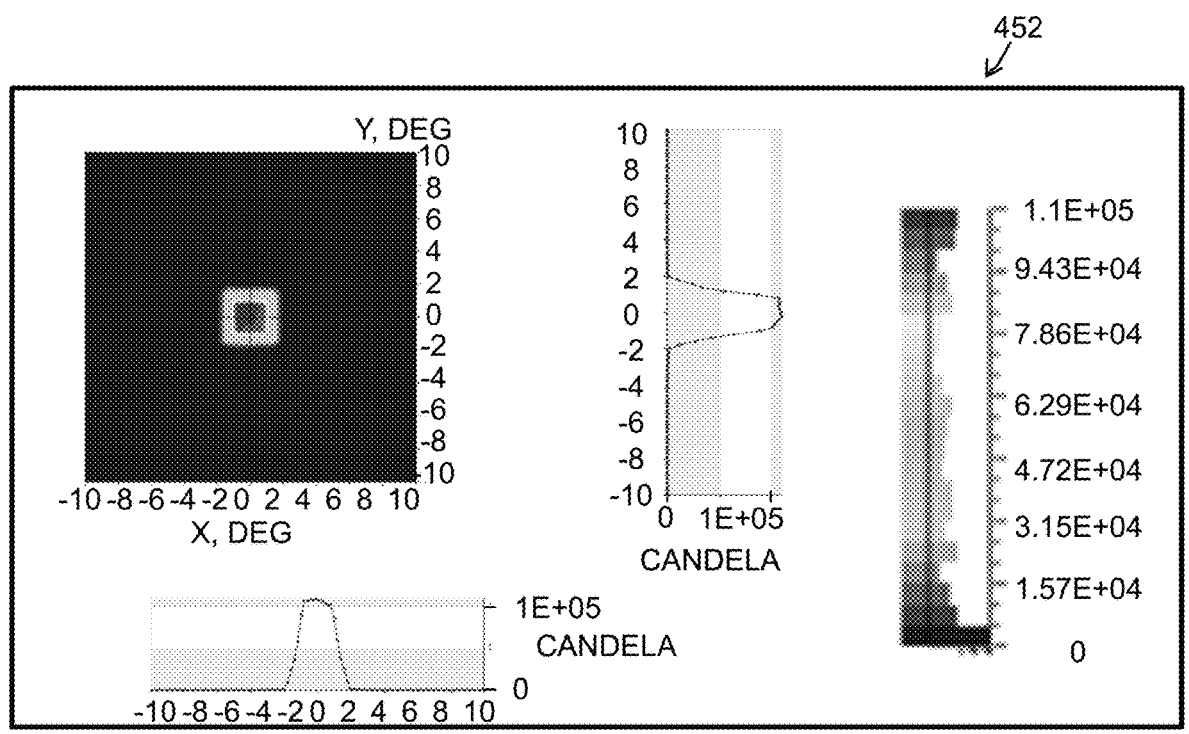

Turning to FIG. 4B, graphs 451 and 452 show far field intensity distributions without and with an etendue re-shaper, respectively, according to one or more embodiments. Further, the graphs 451 and 452 show the collimated beam 363 after the etendue re-shaper 350. With the collimated beam 363, in graph 452, the distribution remains centered around an origin, which is an acceptable MLA input despite losing "sharpness". As described herein, optimization of the etendue re-shaper 350 improves the sharpness.

Figure 5:
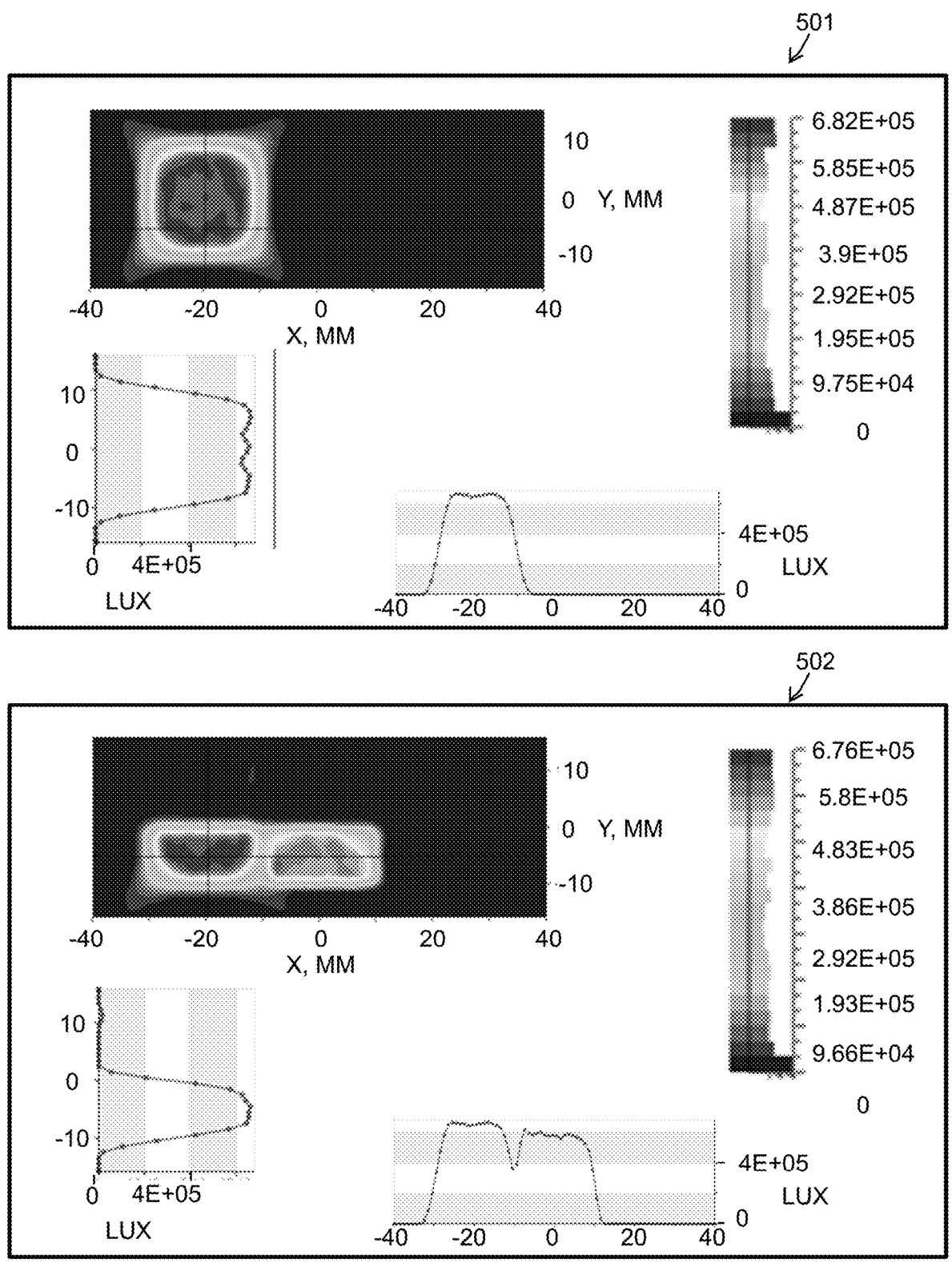
FIG. 5 shows graphs of illuminance profiles at an exit position of an etendue re-shaper according to one or more embodiments.

Turning to FIG. 5, graphs 501 and 502 show illuminance profiles at an exit position of the etendue re-shaper 350, with the graph 501 being without and the graph 502 being with the etendue re-shaper 350. Continuing with the example herein, the original beam size of 20×20 mm² has been reshaped to 10×40 mm², thus demonstrating a potential of the etendue re-shaper 350.

According to one or more embodiments, the etendue re-shaper 350 can include deflecting surfaces, each of which has a single interaction (e.g., total internal reflection) with the beam parts. Further, the etendue re-shaper 350 can, in combination with deflecting sections, include straight sections therebetween to provide a total length of the etendue re-shaper 350 within bounds that reduce or eliminate a kaleidoscopic effect, which lead to a non-homogeneous illuminance profile and stray light.

Figure 6:
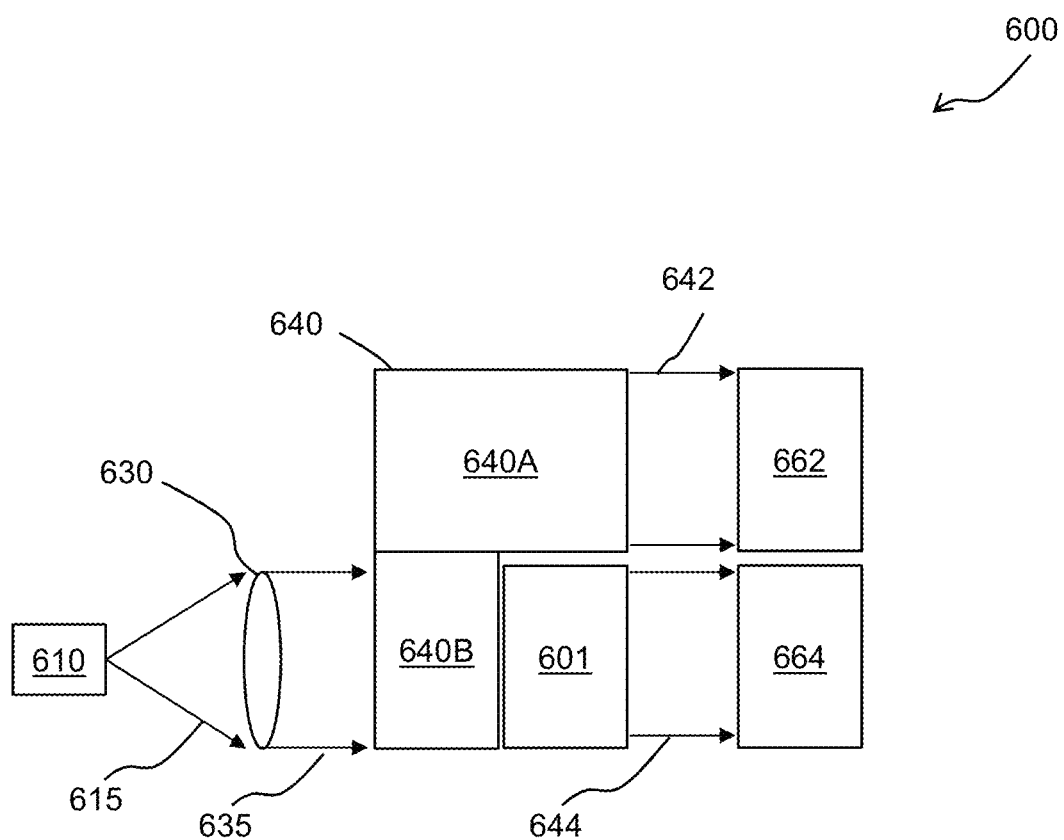
FIG. 6 shows a schematic of an optical system according to one or more embodiments.

FIG. 6 shows a schematic of an optical system 600 according to one or more embodiments. Generally, a narrowly collimated beam (e.g., approximately 2.5°) assists in avoiding kaleidoscopic effects, where a part of a collimated beam interferes with the re-shaper. For a beam with less collimation, a part of a collimated beam will not interfere with the etendue re-shaper and, hence, the horizontal spread of the beam part at the exit plane of the etendue re-shaper becomes larger. Avoiding the interaction, thus, introduces a gap between two rectangular illuminance plots. The optical system 600 can, in turn, include an optical relay system 601.

The optical system 600 can include a light emitting diode ("LED") 610 to generate light emissions 615. The light emissions 615 are passed (as shown by the arrows, which optical paths and collimation) through a collimator 630 to generate a collimated beam 635. The optical system 600 further utilizes an etendue re-shaper 640 to split the collimated beam 635 in two or more beam parts (i.e., two beam parts 642 and 644) and arranges the two or more beam parts adjacent to each other, which generates an adjacent beam part arrangement. Note that the etendue re-shaper 640 can include a first part 640A and a second part 640B. The first part 640A reshapes a 'first beam part' of the collimated beam. The second part 640B propagates a 'second beam part' of the collimated beam to the optical relay system 601. Note that first and second are used herein to describe separate beam parts and etendue parts and positions thereof can be designated as lower, upper, side, back, front etc.

The optical relay system 601 maps a light distribution of the second beam part of the collimated beam to a same plane as an exit plane of the etendue re-shaper 640. The optical relay system 601 comprises two lenses. The two lenses are rectangularly shaped, with a focal plane of each lens at a center plane of the other lens. According to one or more embodiments, the optical relay system 601 can control a divergence with a 1:1 telescope of two lenses. The technical effects, advantages, and benefits of the optical relay system 601 include avoiding interaction of a second part of the collimated beam 635 with the etendue re-shaper 640, thereby avoiding kaleidoscopic effects. Further, when light is mixed while maintaining a phase space volume shape, an optical element can be inserted in the optical relay system 601. The optical element can be, for instance, an absorber that adjusts a flux in the second part of the collimated beam 635 to match an illuminance of the second part with an illuminance of the first part of the collimated beam 635 at the exit plane of the etendue re-shaper 640. For instance, if illuminances of both parts are not equal, the optical element could level these illuminances. Other optical elements can be designed to tweak the second part's phase space volume. Alternatively, the etendue re-shaper 640 can be curved or shaped such that the wall can adjust the phase space volume of the first part of the beam. The result of the etendue re-shaper 240 and the optical relay system 601 is a collimated beam with a reduced height and an increased width that is provided to one or more MLAs (i.e., two MLAs 662 and 664). The optical relay system 601 can also be constructed with the two MLAs 662 and 664 to provide the advantage and benefit of mixing the two MLAs 662 and 664 with the two lenses of the optical relay system 601.

Figure 7:
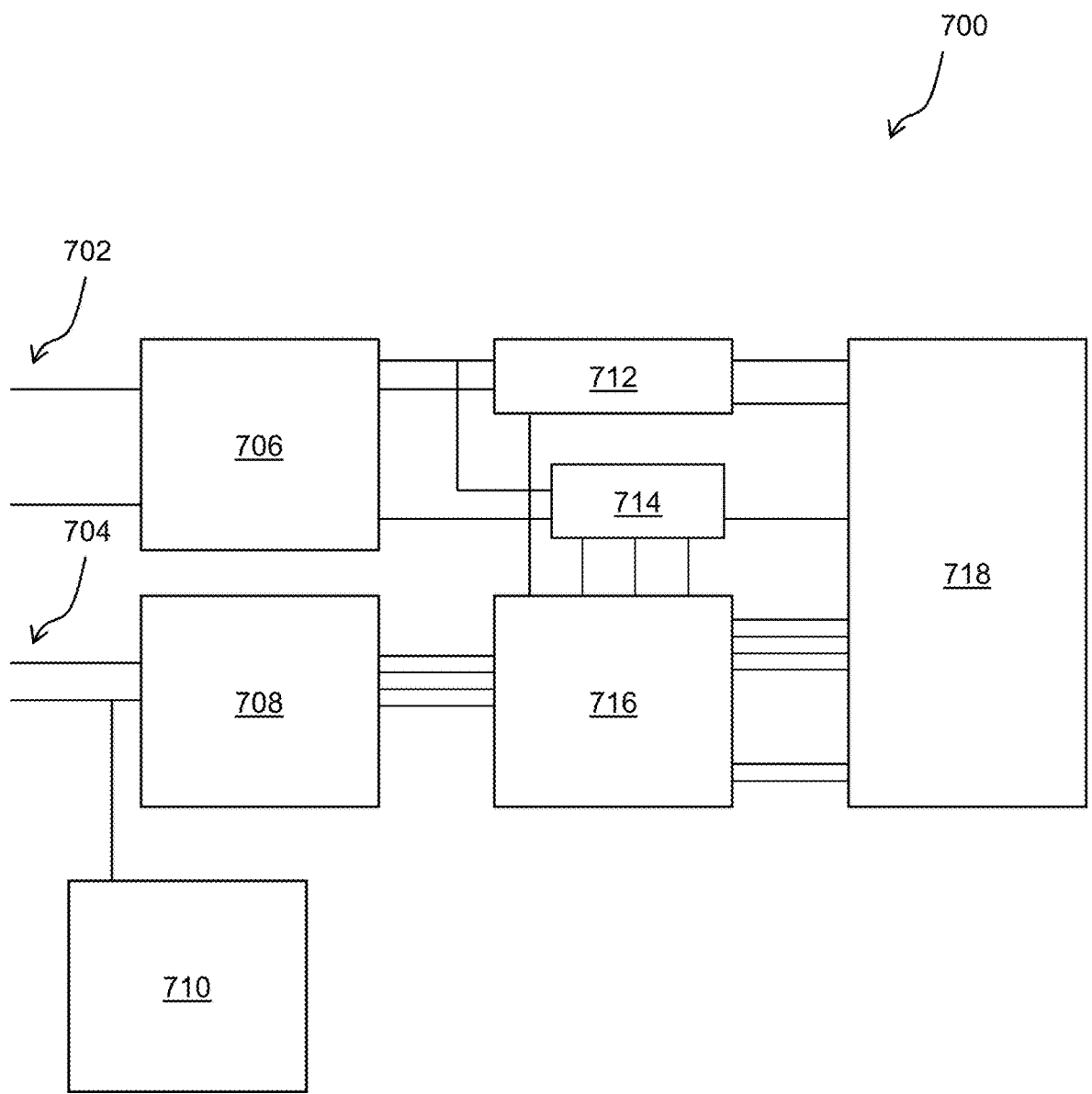
FIG. 7 is a diagram of an example vehicle headlamp system.

FIG. 7 is a diagram of an example vehicle headlamp system 700 that may incorporate one or more of the embodiments and examples described herein. The example vehicle headlamp system 700 illustrated in FIG. 7 can include power lines 702, a data bus 704, an input filter and protection module 706, a bus transceiver 708, a sensor module 710, an LED direct current to direct current (DC/DC) module 712, a logic low-dropout (LDO) module 714, a micro-controller 716 and an active head lamp 718.

The power lines 702 may have inputs that receive power from a vehicle, and the data bus 704 may have inputs/outputs over which data may be exchanged between the vehicle and the vehicle headlamp system 700. For example, the vehicle headlamp system 700 may receive instructions from other locations in the vehicle, such as instructions to turn on turn signaling or turn on headlamps, and may send feedback to other locations in the vehicle if desired. The sensor module 710 may be communicatively coupled to the data bus 704 and may provide additional data to the vehicle headlamp system 700 or other locations in the vehicle related to, for example, environmental conditions (e.g., time of day, rain, fog, or ambient light levels), vehicle state (e.g., parked, in-motion, speed of motion, or direction of motion), and presence/position of other objects (e.g., vehicles or pedestrians). A headlamp controller that is separate from any vehicle controller communicatively coupled to the vehicle data bus may also be included in the vehicle headlamp system 700. In FIG. 7, the headlamp controller may be a micro-controller, such as micro-controller (μc) 716. The micro-controller 716 may be communicatively coupled to the data bus 704.

The input filter and protection module 706 may be electrically coupled to the power lines 702 and may, for example, support various filters to reduce conducted emissions and provide power immunity. Additionally, the input filter and protection module 706 may provide electrostatic discharge (ESD) protection, load-dump protection, alternator field decay protection, and/or reverse polarity protection.

The LED DC/DC module 712 may be coupled between the input filter and protection module 106 and the active headlamp 718 to receive filtered power and provide a drive current to power LEDs in the LED array in the active headlamp 718. The LED DC/DC module 712 may have an input voltage between 7 and 18 volts with a nominal voltage of approximately 13.2 volts and an output voltage that may be slightly higher (e.g., 0.3 volts) than a maximum voltage for the LED array (e.g., as determined by factor or local calibration and operating condition adjustments due to load, temperature or other factors).

The logic LDO module 714 may be coupled to the input filter and protection module 706 to receive the filtered power. The logic LDO module 714 may also be coupled to the micro-controller 716 and the active headlamp 718 to provide power to the micro-controller 716 and/or electronics in the active headlamp 718, such as CMOS logic.

The bus transceiver 708 may have, for example, a universal asynchronous receiver transmitter (UART) or serial peripheral interface (SPI) interface and may be coupled to the micro-controller 716. The micro-controller 716 may translate vehicle input based on, or including, data from the sensor module 710. The translated vehicle input may include a video signal that is transferrable to an image buffer in the active headlamp 718. In addition, the micro-controller 716 may load default image frames and test for open/short pixels during startup. In embodiments, an SPI interface may load an image buffer in CMOS. Image frames may be full frame, differential or partial frames. Other features of micro-controller 716 may include control interface monitoring of CMOS status, including die temperature, as well as logic LDO output. In embodiments, LED DC/DC output may be dynamically controlled to minimize headroom. In addition to providing image frame data, other headlamp functions, such as complementary use in conjunction with side marker or turn signal lights, and/or activation of daytime running lights, may also be controlled.

Figure 8:
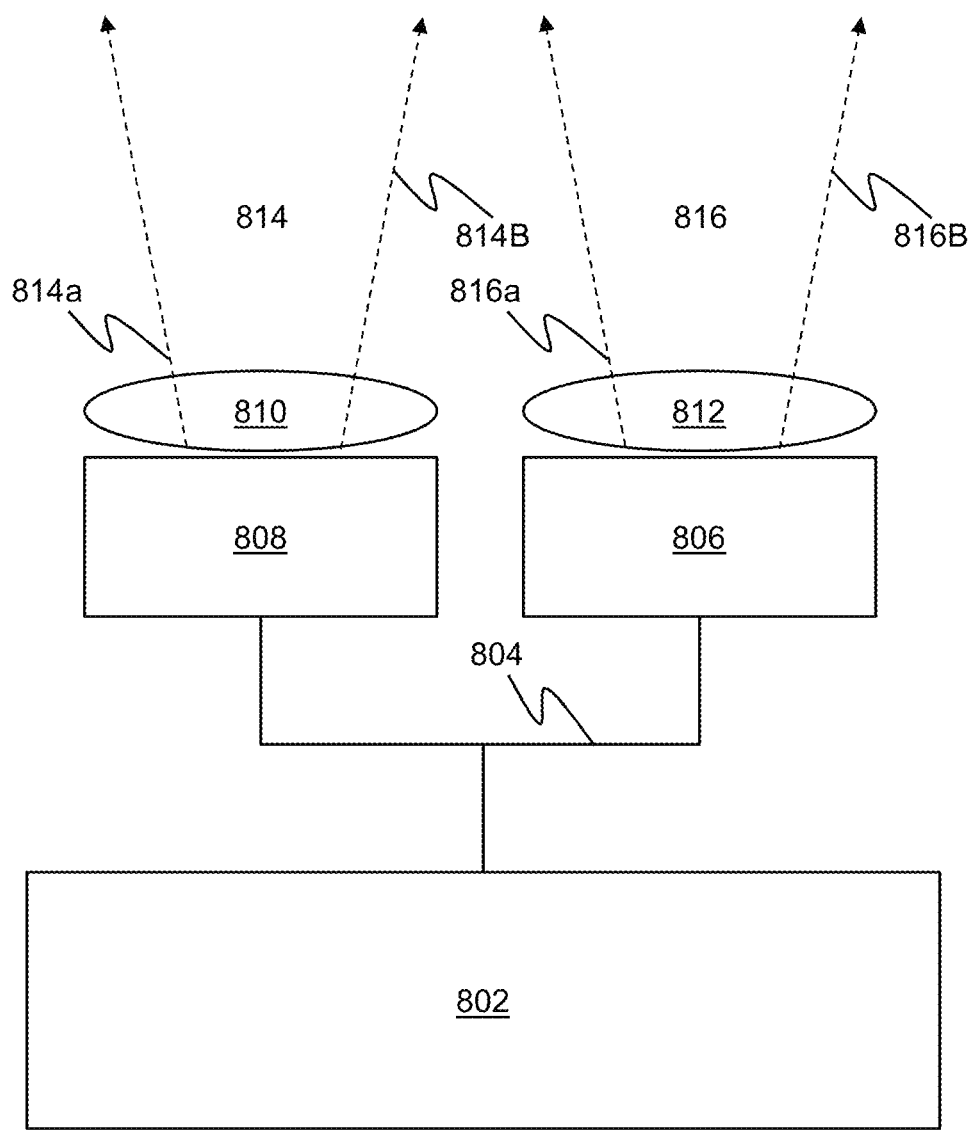
FIG. 8 is a diagram of another example vehicle headlamp system.

FIG. 8 is a diagram of another example vehicle headlamp system 800. The example vehicle headlamp system 800 illustrated in FIG. 8 includes an application platform 802, two LED lighting systems 806 and 808, and secondary optics 810 and 812.

The LED lighting system 808 may emit light beams 814 (shown between arrows 814a and 814b in FIG. 8). The LED lighting system 806 may emit light beams 816 (shown between arrows 816a and 816b in FIG. 8). In the embodiment shown in FIG. 8, a secondary optic 810 is adjacent the LED lighting system 808, and the light emitted from the LED lighting system 808 passes through the secondary optic 810. Similarly, a secondary optic 812 is adjacent the LED lighting system 806, and the light emitted from the LED lighting system 806 passes through the secondary optic 812. In alternative embodiments, no secondary optics 810/812 are provided in the vehicle headlamp system.

Where included, the secondary optics 810/812 may be or include one or more light guides. The one or more light guides may be edge lit or may have an interior opening that defines an interior edge of the light guide. LED lighting systems 808 and 806 may be inserted in the interior openings of the one or more light guides such that they inject light into the interior edge (interior opening light guide) or exterior edge (edge lit light guide) of the one or more light guides. In embodiments, the one or more light guides may shape the light emitted by the LED lighting systems 808 and 806 in a desired manner, such as, for example, with a gradient, a chamfered distribution, a narrow distribution, a wide distribution, or an angular distribution.

The application platform 802 may provide power and/or data to the LED lighting systems 806 and/or 808 via lines 804, which may include one or more or a portion of the power lines 702 and the data bus 704 of FIG. 7. One or more sensors (which may be the sensors in the vehicle headlamp system 800 or other additional sensors) may be internal or external to the housing of the application platform 802. Alternatively, or in addition, as shown in the example vehicle headlamp system 700 of FIG. 7, each LED lighting system 808 and 806 may include its own sensor module, connectivity and control module, power module, and/or LED array.

In embodiments, the vehicle headlamp system 800 may represent an automobile with steerable light beams where LEDs may be selectively activated to provide steerable light. For example, an array of LEDs or emitters may be used to define or project a shape or pattern or illuminate only selected sections of a roadway. In an example embodiment, infrared cameras or detector pixels within LED lighting systems 806 and 808 may be sensors (e.g., similar to sensors in the sensor module 710 of FIG. 7) that identify portions of a scene (e.g., roadway or pedestrian crossing) that require illumination.

As would be apparent to one skilled in the relevant art, based on the description herein, embodiments of the present invention can be designed in software using a hardware description language (HDL) such as, for example, Verilog or VHDL. The HDL-design can model the behavior of an electronic system, where the design can be synthesized and ultimately fabricated into a hardware device. In addition, the HDL-design can be stored in a computer product and loaded into a computer system prior to hardware manufacture.

Having described the embodiments in detail, those skilled in the art will appreciate that, given the present description, modifications may be made to the embodiments described herein without departing from the spirit of the inv concept. Therefore, it is not intended that the scope of the invention be limited to the specific embodiments illustrated and described.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper," "side," "back," "front," "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

What is claimed is:

1. An optical system comprising:
a collimator configured to receive light emissions and generate a collimated beam;
an etendue re-shaper configured to split the collimated beam into at least two beam parts and arrange the at least two beam parts adjacent to each other to generate an adjacent beam part arrangement; and
an optical relay system configured to map a light distribution of a beam part of the at least two beam parts to a same plane as an exit plane of the etendue re-shaper.

2. The optical system of claim 1, wherein the optical system comprises a light emitting diode configured to generate the light emissions when powered on.

3. The optical system of claim 1, wherein the optical system comprises two or more micro-lens arrays configured to receive the adjacent beam part arrangement and generate two or more beams, each of the two or more beams comprising an optimum optical efficiency and a far field intensity distribution.

4. The optical system of claim 1, wherein the etendue re-shaper comprises a first part that propagates the beam part of the at least two beam parts to the optical relay system.

5. The optical system of claim 4, wherein the optical relay system is configured to propagate the beam part of the at least two beam parts from the first part to the same plane as the exit plane of the etendue re-shaper.

6. The optical system of claim 4, wherein the etendue re-shaper comprises a second part that reshapes a second beam part of the at least two beam parts and propagates the second beam part to the exit plane of the etendue re-shaper.

7. The optical system of claim 1, wherein the optical relay system comprises two lenses.

8. The optical system of claim 7, wherein the two lenses comprise rectangular shapes.

9. The optical system of claim 7, wherein a focal plane of each of the two lenses is at a center plane of another lens of the two lenses.

10. The optical system of claim 1, wherein the optical relay system comprises an optical element.

11. The optical system of claim 10, wherein the optical element comprises an absorber configured to adjust a flux in the beam part of the collimated beam to match an illuminance of the beam part with an illuminance of a second beam part of the collimated beam at an exit plane of the etendue re-shaper.

12. The optical system of claim 1, wherein the etendue re-shaper comprise walls shaped to adjust a phase space volume of the beam part of the collimated beam.

13. The optical system of claim 1, wherein the at least two beam parts interact once with each deflecting surface of the etendue re-shaper.

14. The optical system of claim 1, wherein the etendue re-shaper comprises a plurality of deflecting surfaces, each of which interacts with a whole beam part of the at least two beam parts.

15. An optical system comprising:
a collimator configured to receive light emissions and generate a collimated beam;
an etendue re-shaper configured to split the collimated beam into at least two beam parts and arrange the at least two beam parts adjacent to each other to generate an adjacent beam part arrangement; and
an optical relay system configured to map a light distribution of a beam part of the at least two beam parts to a same plane as an exit plane of the etendue re-shaper, the optical relay system comprising an absorber configured to adjust a flux in the beam part of the collimated beam to match an illuminance of the beam part with an illuminance of a second beam part of the collimated beam at an exit plane of the etendue re-shaper.

\* \* \* \* \*